(12) United States Patent
Moutin et al.

(10) Patent No.: US 6,678,331 B1
(45) Date of Patent: Jan. 13, 2004

(54) MPEG DECODER USING A SHARED MEMORY

(75) Inventors: Jean-Michel Moutin, Echirolles (FR); Pierre Marty, Seyssins (FR)

(73) Assignee: STMicroelectronics S.A., Montrouge (FR)

( * ) Notice: Subject to any disclaimer, the term of this patent is extended or adjusted under 35 U.S.C. 154(b) by 454 days.

(21) Appl. No.: 09/705,338

(22) Filed: Nov. 2, 2000

(30) Foreign Application Priority Data

Nov. 3, 1999 (FR) .............................. 99 14010

(51) Int. Cl.$^7$ .......................... H04N 7/12; G06F 12/00; G06F 15/167; G06F 3/00
(52) U.S. Cl. ............................ 375/240.25; 375/240.26; 709/213; 710/40; 711/151
(58) Field of Search ...................... 375/240.25, 240.26, 375/240.28, 240.29; 709/102–103, 212–215, 247; 710/40, 240–244, 113–114; 711/147–153, 158

(56) References Cited

U.S. PATENT DOCUMENTS

| | | | | |
|---|---|---|---|---|
| 5,212,742 A | * | 5/1993 | Normile et al. | 382/166 |
| 5,440,752 A | | 8/1995 | Lentz et al. | 395/800 |
| 5,778,096 A | * | 7/1998 | Stearns | 382/233 |
| 5,793,384 A | * | 8/1998 | Okitsu | 345/535 |
| 5,809,538 A | * | 9/1998 | Pollmann et al. | 711/151 |
| 5,812,789 A | * | 9/1998 | Diaz et al. | 709/247 |
| 5,960,464 A | * | 9/1999 | Lam | 711/206 |
| 5,982,360 A | | 11/1999 | Wu et al. | 345/202 |
| 6,058,459 A | | 5/2000 | Owen et al. | 711/151 |

FOREIGN PATENT DOCUMENTS

| | | |
|---|---|---|
| EP | 0710029 | 5/1996 |
| GB | 2329985 | 4/1999 |

OTHER PUBLICATIONS

Bilas et al, "Real–Time Parallel MPEG–2 Decoding in Software", Parallel Processing Symposium, IEEE, pp. 197–203, Apr. 1997.*
Bala et al, "Experiences with Software MPEG–2 Video Decompression on an SMP PC", Architectural and OS Support for Multimedia Applications/Flexible Communication Systems/Wireless Networks and Mobile Computing, IEEE, pp. 26–36, Aug. 1998.*
Lin et al., "On the bus arbitration for MPEG2 video decoder", International Symposium on VLSI Technology, Systems, and Applications, IEEE, pp. 201–205, May 1995.*
Li et al., "Architecture and bus–arbitration schemes for MPEG–2 video decoder", IEEE Trans. on Video Technology, vol. 9, iss. pp. 727–736, Aug. 1999.*
Ling et al., "A bus–monitoring model for MPEG video decoder design", IEEE Trans. on Consumer Electronics, vol. 43, iss. 3, pp 526–530, Aug. 1997.*

* cited by examiner

Primary Examiner—Vu Le
(74) Attorney, Agent, or Firm—Lisa K. Jorgenson; Robert Iannucci; Seed IP Law Group PLLC

(57) ABSTRACT

A circuit includes a microprocessor, an MPEG decoder for decoding an image sequence, and a memory common to the microprocessor and to the decoder. The circuit also includes a circuit for evaluating a decoder delay, a control circuit for, if the decoder delay is greater than a predetermined level, granting the decoder a memory access priority, and otherwise, granting the microprocessor the memory access priority.

23 Claims, 5 Drawing Sheets

MPEG DECODER USING A SHARED MEMORY

TECHNICAL FIELD

The present invention relates to circuits for decompressing image sequences coded according to standard MPEG, and more specifically to a circuit including a microprocessor and an MPEG decoder that use a common memory.

BACKGROUND OF THE INVENTION

The MPEG coding standard enables storing the images of a digital image sequence in a reduced memory space. An image sequence coded according to the MPEG standard can be decoded by an MPEG decoder. An MPEG decoder can, for the decoding of an image in a sequence, use the data of the already decoded adjacent images stored in a buffer. The memory in which the coded images are stored and the buffer usually are two areas of a same memory in which the MPEG decoder can read and write. An MPEG decoder currently belongs to a circuit that further includes a microprocessor especially having the function of managing the circuit interfaces, peripherals, and internal registers. Conventionally, the microprocessor also requires for its operation the ability to read from and write into a memory.

FIG. 1 schematically shows a circuit 2 including an MPEG decoder 4 and a microprocessor 6, respectively connected to memories 8 and 10. Decoder 4 exchanges addresses and data with memory 8 via a bus D1. Decoder 4 generates a signal RW1 for controlling memory 8 in the read or write mode. The microprocessor 6 exchanges addresses and data with memory 10 via a bus D2. Microprocessor 6 generates a signal RW2 for controlling memory 10 in the read or write mode.

Such a use of two distinct memories increases the circuit cost. Thus, it has been desired to group memories 8 and 10 together in a single memory shared by the decoder and by the microprocessor.

FIG. 2 schematically shows a circuit 11 that includes an MPEG decoder 4 and a microprocessor 6, connected to a single memory 12 by data buses D1 and D2, via a control circuit 14. Control circuit 14, connected to receive read/write control signals RW1 and RW2 respectively generated by decoder 4 and microprocessor 6, provides a read/write signal RW to memory 12. Control circuit 14 is connected to memory 12 by a bus D.

In such a circuit, however, conflicts for access to memory 12 appear when decoder 4 and microprocessor 6 must have access to memory 12 at the same time. Control circuit 14 must thus be provided to grant priority of access to the decoder or to the microprocessor. When the decoder and the microprocessor must both perform a large number of memory accesses, and if the access priority is granted to the microprocessor, the decoder receives an insufficient number of data and it accumulates delay in the decoding. If the access priority is granted to the decoder, the microprocessor cannot operate at its maximum speed and its performances are altered. Too great a delay in the data decoding causes a circuit malfunction. For example, when the decoded data are intended for being displayed, a datum decoded too late will not be displayed on time, which will adversely affect the display quality. Thus, a conventional solution consists of granting the access priority to the decoder, while accepting a debased operation of the microprocessor.

SUMMARY OF THE INVENTION

An embodiment of the present invention provides a control circuit that limits the debasing of the microprocessor performance without causing any decoder malfunction. The control circuit grants priority to the microprocessor as long as the decoder is not delayed and, when the decoder is delayed, grants priority to the decoder until it has caught up on its delay.

The control circuit also provides means for evaluating the decoder delay.

More specifically, the circuit includes a microprocessor, an MPEG decoder for decoding an image sequence, and a memory common to the microprocessor and to the decoder, which also includes a circuit for evaluating the decoder delay, a control circuit for, if the decoder delay is greater than a predetermined level, granting the decoder the memory access priority, and otherwise, granting the microprocessor the memory access priority.

The circuit includes a clock, means for determining a reference period equal to a determined number of clock cycles, and means for determining an activity threshold. Furthermore, the circuit for evaluating the decoder delay includes means for determining during each clock cycle whether the decoder is used or unused, a counter having its content incremented each time the decoder is unused during a cycle, a subtractor, which at the beginning of each reference period subtracts the threshold from the counter content, and a comparator for checking whether the content of the counter remains negative, the output of this comparator being provided to the control circuit.

According to an embodiment of the present invention, the circuit further includes additional circuits that use the memory via the control circuit with a predetermined activity, and the control circuit is provided to alternately grant access to the memory to the additional circuits, then to the microprocessor and to the decoder. The access to the memory by the microprocessor and the decoder is controlled by the control signal generated by the evaluation circuit.

The foregoing objects, features and advantages of the present invention will be discussed in detail in the following non-limiting description of specific embodiments in connection with the accompanying drawings.

DETAILED DESCRIPTION OF THE INVENTION

Figure 1:
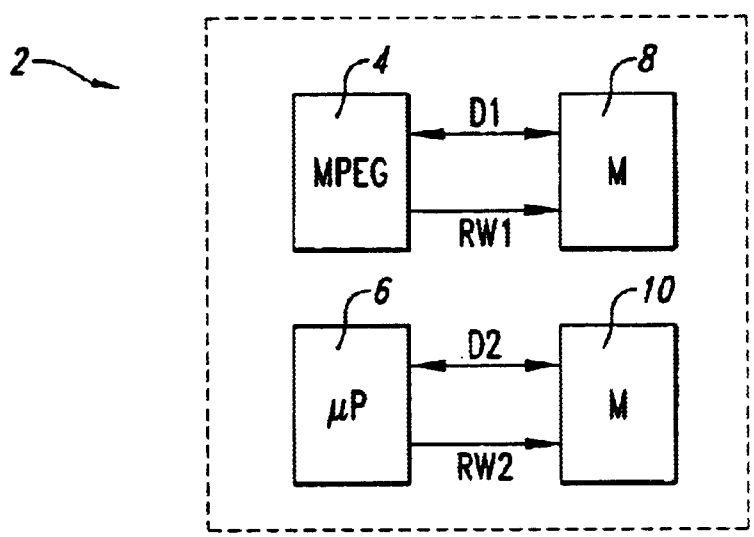
FIG. 1 schematically shows a circuit including an MPEG decoder and a microprocessor using non-shared memories.
Figure 2:
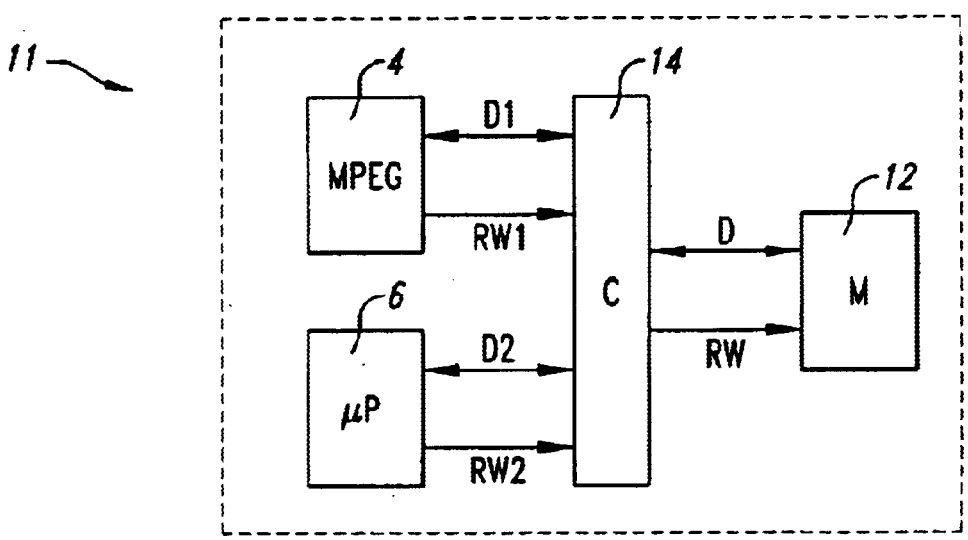
FIG. 2 schematically shows a circuit including an MPEG decoder and a microprocessor using a shared memory.
Figure 3:
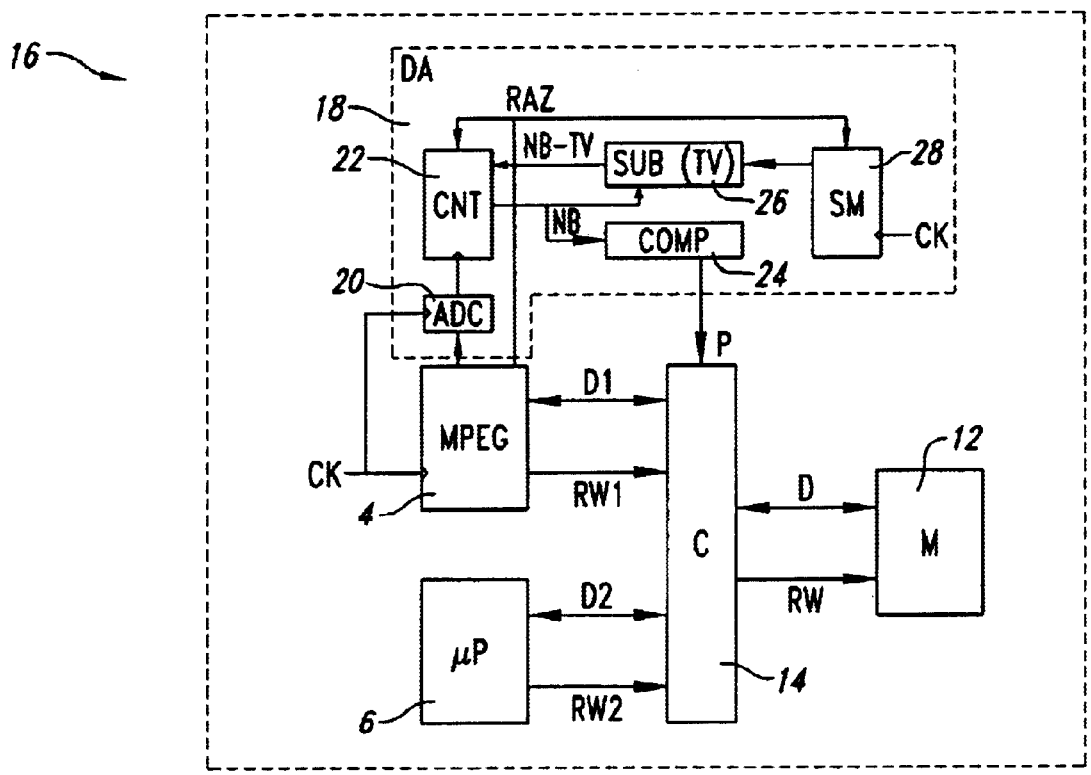
FIG. 3 shows a circuit, including an MPEG decoder and a microprocessor, using a shared memory according to the present invention.

FIG. 3 schematically shows a circuit 16 in which the same references refer to the same elements as in FIG. 2. Circuit 16 includes the same elements as in FIG. 2, and further includes a circuit 18 for evaluating the delay of decoder 4, which provides a control signal P to control circuit 14. A clock signal CK rates decoder 4 and evaluation circuit 18. The evaluation circuit 18 includes an activity determination circuit (ADC) 20 for determining upon each cycle of the clock CK whether the decoder is used or not. The activity determination circuit 20 is coupled to a counter 22, the signed content NB of which is provided to a sign comparator 24. The output of comparator 24 is signal P provided to control circuit 14. In an initial state, signal P is inactive and the control circuit 14 is set to grant microprocessor 6 priority of access to the memory. When content NB of the counter is positive, signal P is activated and control circuit 14 provides priority of access to the memory to decoder 4. Circuit 18 further includes a subtractor 26 connected to subtract a predetermined threshold value TV from the content NB of counter 22. Circuit 18 also includes a state machine 28 rated by clock CK, and connected to control subtractor 26. State machine 28 and counter 22 are reset at the beginning of the decoding of each image in response to a signal RAZ generated by decoder 4 signaling the receipt of a coded image, as discussed below.

Conventionally, the use made of the decoded images (for example their display) imposes on the decoder 4 a predetermined maximum time to decode a coded image received on bus D1. A coded image has a fixed size for the images of a sequence. The image size may vary from one sequence to another. A threshold operating speed that corresponds to the optimal decoding of a coded image of given size in the predetermined time is defined for decoder 4. If the decoder operates faster than the threshold speed, it decodes the coded data of an image faster than necessary for the sequencing of the circuit operations, that is, it accumulates advance. It should be noted that the decoded data are conventionally stored in a buffer before being used. If the decoder operates slower than the threshold speed, it no longer accumulates advance and it may progressively loose the advance that may have been previously accumulated, which may cause a circuit malfunction. A decoder that can operate at a maximum speed greater than the threshold voltage is used. Decoder 4 is rated at a fixed rate by clock signal CK and the decoder operating speed is measured by the number of cycles of clock CK during which the decoder is used, in a predetermined reference period of T cycles.

Whether the decoder is used or not during a cycle of clock CK may be evaluated by observing a particular signal of an internal block (PIPE) of the decoder, corresponding to the state of the decoder: active (signal at 1) or inactive (signal at 0). If the observed signal has value 0 when the decoder is unused, the activity determination circuit 20 includes for example an AND gate having an input connected to the inverted observed signal and a second input receiving clock CK. The output of this AND gate is connected to counter 22 to increment counter 22 for each cycle during which the decoder is unused: content NB of the counter increases all the more as the decoder is rarely used. At the beginning of the coding of each image, counter 22 is set to a negative value equal to threshold value TV that corresponds, for a predetermined reference period T, to the number of cycles of clock CK during which the decoder, if it operates at the threshold speed, is unused. State machine 28 is provided for, every reference period T, giving an order to subtractor 26 to subtract threshold value TV from content NB of the counter. Thus, content NB of the counter becomes more negative, for each reference period, if it increases by a value smaller than threshold value TV during the reference period. If content NB of the counter is positive, comparator 24 activates control signal P provided to control circuit 14, which grants the decoder 4 priority of access to memory 12. As long as content NB of the counter is negative, for instance, at the beginning of each image decoding, microprocessor 6 holds the priority access to the memory.

Figure 4:
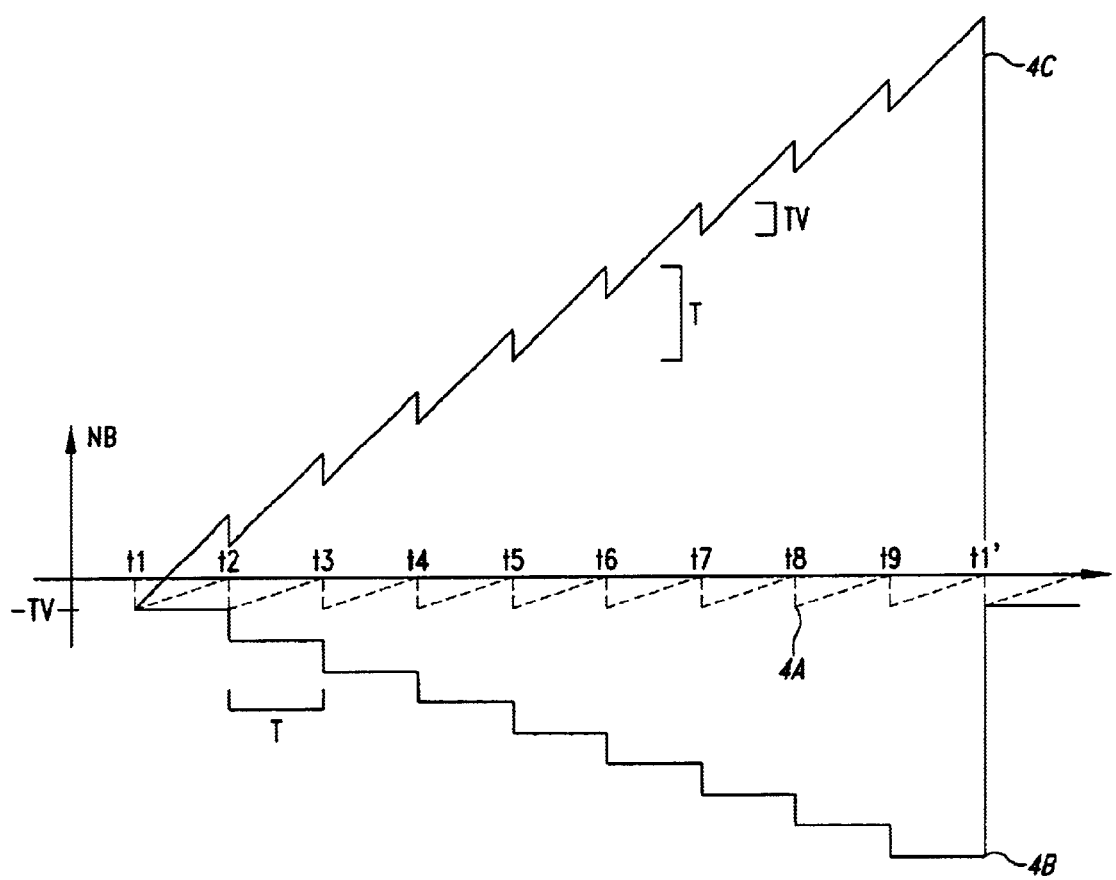
FIG. 4 illustrates the operating principle of the delay evaluation circuit of FIG. 3.

FIG. 4 shows three curves 4A, 4B, and 4C that illustrate the evolution of content NB of counter 22 for three different operating speeds of decoder 4, upon decoding an image during nine reference periods T starting at times t1 to t9. For clarity, an image decoding only lasting for nine reference periods has been taken as an example, but it should be noted that in reality, an image is decoded in approximately 8,000 reference periods, a reference period T corresponding to approximately 200 clock cycles.

Curve 4A illustrates the theoretical case where the microprocessor, which has priority access to the memory, operates at a constant speed enabling decoder 4 to operate at the threshold speed, without taking any advance or delay. At the beginning of the decoding, at time t1, counter 22 is set to a negative value equal to threshold value TV. At times t2 to t9, state machine 28 controls subtractor 26 to subtract threshold value TV from content NB of the counter. Since the decoder operates at the threshold speed, it is, during a period T, unused during a number of cycles equal to the number TV. Thus, the content of counter 22 increases by value—TV to 0 between times t1 and t2, t2 and t3, and so on, according to a sawtooth-shaped curve. A time t1' that corresponds to the beginning of the decoding of a next image is shown. Content NB of the counter is set to a value—TV at time t1'.

Curve 4B illustrates the theoretical case where the microprocessor operates at a sufficiently slow speed for the data coming from the memory to enable decoder 4 to operate at its maximum speed. At time t1, content NB of the counter is set to value—TV. The decoder is used at each clock cycle and content NB of the counter thus is never incremented and decreases in stages of value TV at times t2 to t9. Decoder 4 operates by accumulating advance, and the more the content NB of the counter is negative, the greater this advance. It should be noted that the size of counter 22 must be provided to count to a negative number equal to "n" times TV where "n" is the number of reference periods T necessary to process an image (here, 9). At time t1', at the beginning of a following image, content NB of counter 22 is reset to value—TV.

Curve 4C illustrates a theoretical case where the microprocessor would operate continuously at a sufficiently high speed for the decoder to receive no data. Such a curve does not involve the change of memory access priority according to the present invention and it cannot correspond to a real operation. This curve is only shown to ease the understanding of the following drawings. At times t1 and t1', content NB of the counter is set to value—TV and value TV is subtracted from content NB of the counter at times t2 to t9. The decoder is unused and content NB of the counter is incremented for each cycle of clock CK. Content NB of the counter thus increases by value T during each reference period T, between times t1 and t2, t2 and t3, and so on. Decoder 4 here operates by accumulating delay; the more content NB of the counter is positive, the greater the accumulated delay.

For clarity, the decodings of FIGS. 4A, 4B, and 4C have been shown as having the same duration. In reality, the decodings performed at higher speeds will be shorter.

Figure 5:
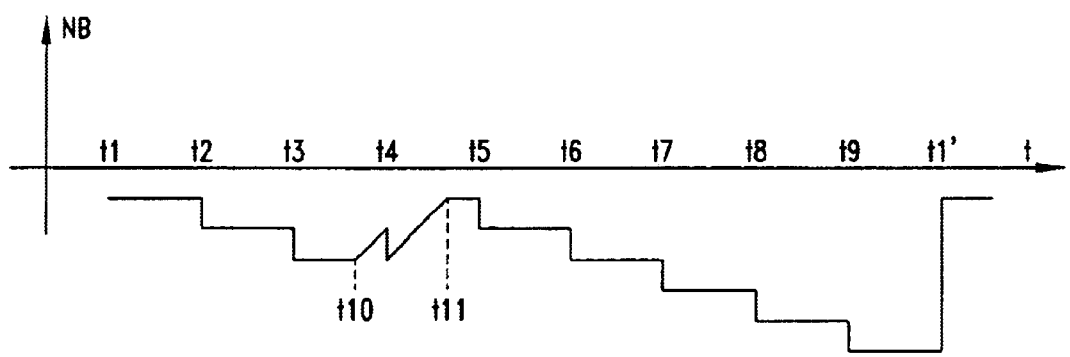
FIG. 5 illustrates the operation of the delay evaluation circuit of FIG. 3, when the decoder is only slightly delayed.

FIG. 5 illustrates by means of the same references as FIG. 4 the operation of counter 22 when decoder 4 starts taking advance on a decoding, then looses this advance without triggering a change in the memory access priority according to the present invention. Between time t1 and a time t10, located between times t3 and t4, the microprocessor activity is low and the decoder operates at a maximum speed. Until time t10, content NB of the counter decreases in stages of value TV with a period T and decoder 4 takes advance. At time t10, the activity of the microprocessor, which has the priority of access to the memory, increases so that the decoder is unused during each cycle. Thus, from time t10 on, counter 22 is incremented at each clock cycle and the decoder progressively looses the accumulated advance. At time t4, content NB of the counter is normally decremented by value TV, then continues increasing until a time t11 included between times t4 and t5. At time t11, the activity peak of the microprocessor stops, so that the decoder can operate at maximum speed again and catch up on its delay. Starting from time t11, content NB of the counter thus decreases in stages of value TV at times t5 to t9.

Time t11 is, in this example, such that counter 22 has not reached a value greater than 0 at time t11. According to the present invention, as long as content NB of the counter does not become positive, the decoder keeps a sufficient advance on the decoding, and it is not necessary to change the priority of access to the memory.

Figure 6:
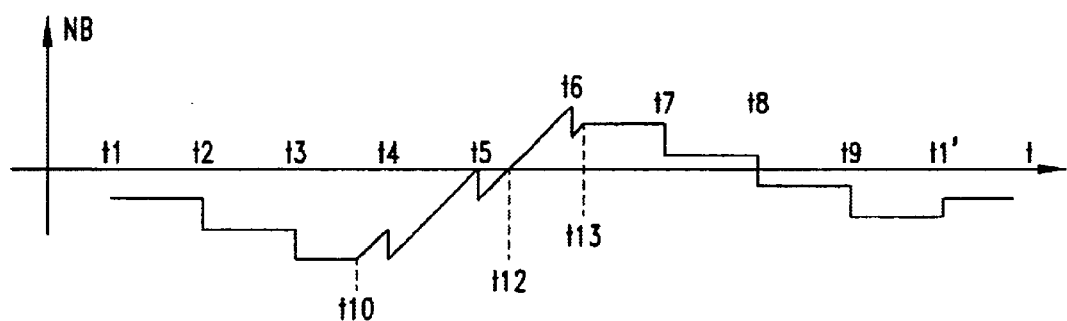
FIG. 6 illustrates the operation of the delay evaluation circuit of FIG. 3, when the decoder is greatly delayed.

FIG. 6 illustrates by means of the same references as FIG. 5 a case where decoder 4 starts taking advance on a decoding, then looses this advance and triggers the change of memory access priority according to the present invention. The microprocessor activity is low between times t1 and t10 so that the decoder operates at a maximum speed. Content NB of the counter decreases in stages of value TV at times t1 to t3. At time t10, the microprocessor activity increases so that the decoder is unused during each cycle. Counter 22 is incremented during each clock cycle from time t10 and content NB of the counter increases until time t4, when the value TV is subtracted therefrom. Content NB of the counter continues increasing until time t5, when threshold value TV is subtracted therefrom again, then it continues increasing until a time t12 when it becomes positive. At time t12, comparator 24 detects that content NB of the counter is positive and it orders control circuit 14 to grant decoder 4 the priority access to the memory. Conventionally, decoder 4 reacts with a certain latency, which corresponds to the time required to renew the content of the decoder buffers. In the example shown, although decoder 4 receives the priority of access to the memory at time t12, the effect of this change is not perceptible on the decoding until time t13, taken between times t6 and t7. Thus, content NB of the counter continues increasing from time t12 to time t6, has the value TV subtracted therefrom at time t6, and then increases from time t6 to time t13. From time t13 on, decoder 4 takes the priority of access to the memory and it operates with a maximum data rate. The content NB of the counter then starts decreasing in stages of value TV at times t7 to t9. It should be noted that, in the example shown, the content NB of the counter becomes negative from time t8 on. The priority access to the memory is then granted back to the microprocessor. It is assumed that the microprocessor activity at time t8 has become sufficiently low to enable decoder 4 to operate without being delayed, although the microprocessor holds the priority of access to the memory again. In the opposite case, content NB of the counter would have started increasing again from time t8 until it becomes positive again and the priority access to the memory is granted back to the decoder.

The determination of threshold value TV can be performed by obtaining the difference between the maximum speed and the speed of decoder 4. For example, if a decoder able to operate at 63 MHz, which must operate at a 55 MHz threshold speed, is used, the decoder will be unused during 11.5% of the clock cycles of a reference period when it will operate at the threshold speed. This amounts to setting threshold value TV to 23 for a reference period T of 200 cycles.

An advantage of the present invention is that counter 22 counts the cycles during which the decoder is unused, which are fewer than the cycles during which the decoder is used. Counter 22 is thus reduced in size. On the other hand, since the value TV is subtracted from the content of counter 22, comparator 24 is a mere sign comparator, instead of a complex digital comparator.

It should be noted that priority of access to the memory is systematically granted to the decoder when content NB of counter 22 becomes positive, although the microprocessor activity can be high. This results in a temporary debasing of the microprocessor performance, to be compared with the permanent debasing of its performance according to prior art. On the other hand, embodiments of the present invention enable optimal operating conditions.

An alternative embodiment of the present invention could decrement the count value each time the MPEG decoder is idle for a clock cycle. In this case, the threshold value TV would be added to the content value NB of the counter. The microprocessor 6 would retain priority access to the memory as long as the sign of the content value NB remained positive.

Of course, the present invention is likely to have various alterations, modifications, and improvements which will readily occur to those skilled in the art. For example, some elements of the previously-described circuit 16 may be included in a same integrated circuit, especially elements 4, 14, and 18. Further, the present invention may be applied to a circuit in which other elements than the MPEG decoder and the microprocessor share the access to a same memory, or to a circuit in which the decoder sequentially decodes images belonging to different sequences, to distribute the decoding time between the different images.

Figure 7:
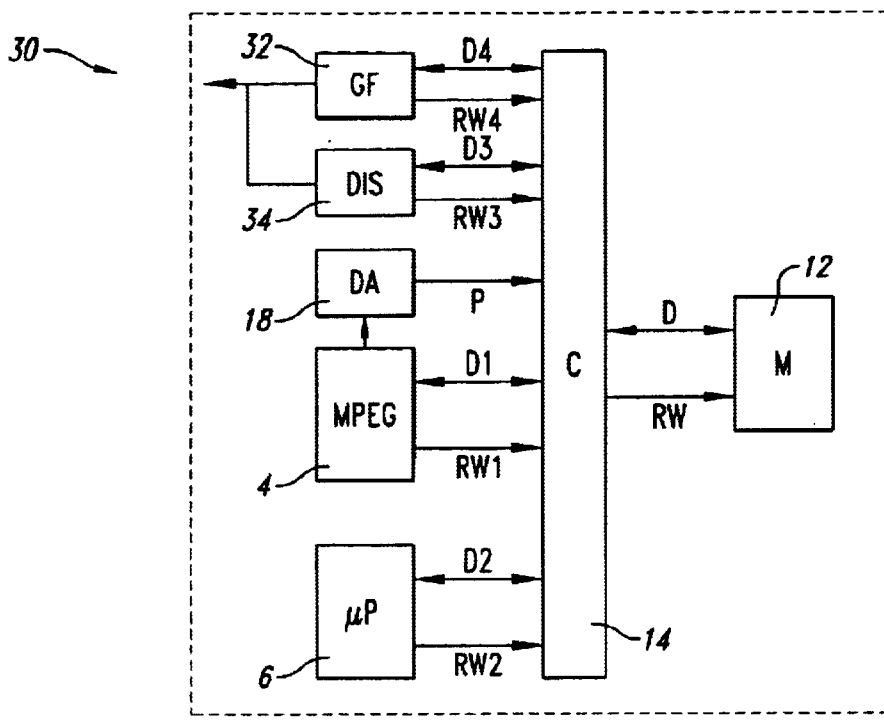
FIG. 7 schematically shows an alternative of the circuit of FIG. 3.

FIG. 7 schematically shows a circuit 30 that includes, in addition to the elements shown in FIG. 3, a graphics function managing circuit 32 and a display management circuit 34. Decoder 4 and microprocessor 6 are connected to memory 12 via control circuit 14, as described hereabove. Graphics function managing circuit 32 is connected to read or write data in memory 12 via a bus D4 connected to control circuit 14, and display circuit 34 is connected to read data from memory 12 via a bus D3 connected to control circuit 14. Control signals R3 and RW4 are respectively provided by the display management circuit 34 and the graphics function managing circuit 32 to control circuit 14.

Assuming that circuits 32 and 34 have a known regular activity, it may be envisaged for control circuit 14 to include a state machine (not shown) able to arbitrate the access to the memory of these blocks in addition to the MPEG decoder and to the microprocessor. A type of arbitration, as an illustration, is the time division into periods of access to memory 12. A first predetermined number of access periods is assigned to circuits 32 and 34 and a second predetermined number of access periods is assigned both to the microprocessor and to the decoder, then these access periods are distributed between the microprocessor and the decoder by a delay evaluation circuit 18.

Figure 8:
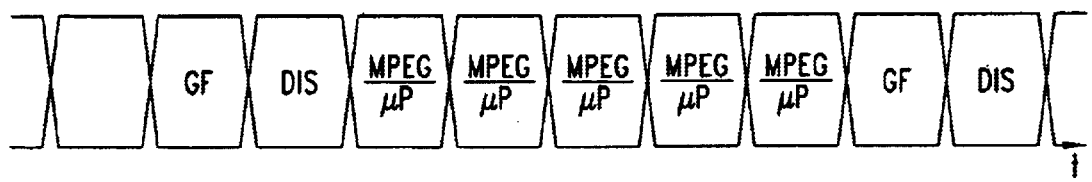
FIG. 8 illustrates the access period distribution in the circuit of FIG. 7.

FIG. 8 schematically illustrates such a time segmentation into periods of access to memory 12. A first access period is assigned to the graphics function managing circuit, a second period is assigned to the display circuit, then five following periods are indifferently assigned to the decoder and to the microprocessor. The following period would be granted to the graphics function managing circuit and so on.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit including a microprocessor, an MPEG decoder for decoding an image sequence, and a memory common to the microprocessor and to the decoder, comprising:

an evaluation circuit for evaluating a decoder delay of the MPEG decoder; and, a control circuit for, if the decoder delay is greater than a predetermined level, granting the decoder a memory access priority, and otherwise, granting the microprocessor the memory access priority.

2. The circuit of claim 1, including a clock, means for determining a reference period equal to a determined number of clock cycles, means for determining an activity threshold, wherein the circuit for evaluating the decoder delay includes:

means for determining during each clock cycle whether the decoder is used or unused, a counter having a count value incremented each time the decoder is unused during a clock cycle, a subtractor which, at the beginning of each reference period, subtracts said activity threshold from the count valve, and a comparator for checking whether the count valve remains negative, the output of this comparator being provided to the control circuit.

3. The circuit of claim 1, further including additional circuits that use the memory via the control circuit at predetermined access time periods, wherein the control circuit is provided to alternately grant access to the memory to the additional circuits, then to the microprocessor and to the decoder, the access to the memory by the microprocessor and the decoder being controlled by a control signal generated by the evaluation circuit.

4. A method of sharing a common memory between a microprocessor and an image decoder for decoding an image sequence, the method comprising:

communicatively linking the memory to a control circuit, the control circuit controlling access to the memory;

communicatively linking the image decoder to the control circuit;

communicatively linking the microprocessor to the control circuit;

evaluating an image decoder delay of the image decoder; and providing a control signal to the control circuit, the control signal configured to instruct the control circuit to grant the image decoder a memory access priority only when the image decoder delay is greater than a predetermined level, and otherwise grant the microprocessor the memory access priority.

5. The method of claim 4 wherein evaluating the image decoder delay includes:

generating a clock signal;

determining a reference period equal to a determined number of clock cycles;

determining an activity threshold value;

determining whether the image decoder is unused during a clock cycle;

updating a count value each time the image decoder is unused during a clock cycle;

adjusting the count value with the activity threshold value;

checking the sign of the count value; and generating the control signal based on the sign on the count value.

6. The method of claim 5 wherein updating is performed once each reference period.

7. The method of claim 5 wherein a state machine determines when updating occurs.

8. The method of claim 5 wherein updating means incrementing.

9. The method of claim 5 wherein adjusting the count value with the activity threshold value means subtracting the activity threshold value from the count value.

10. The method of claim 5 wherein the control signal is configured to grant the microprocessor memory access priority when the sign of the count value is negative.

11. The method of claim 4, further comprising:

sharing the memory with a plurality of additional circuits;

dividing the memory access priority into access time periods;

assigning each additional circuit a predetermined number of access time periods; and assigning the microprocessor and the image decoder a predetermined number of access time periods to share together.

12. The method of claim 4 wherein the image decoder is a MPEG decoder.

13. A circuit for evaluating a delay of an image decoder comprising:

an activity determination circuit that determines whether the image decoder is unused during a clock cycle;

a counter that is coupled to the activity determination circuit and structured to update a count value when the image decoder is unused during a clock cycle;

an arithmetic logic unit that adjusts the count value with an activity threshold value once a reference period; and a comparator for determining a sign of the count value.

14. The circuit of claim 13 further including:

a means for determining the activity threshold value;

a means for determining the reference period equal to a determined number of clock cycles.

15. The circuit of claim 13 further including:

a state machine, the state machine used to instruct the arithmetic logic unit when to adjust the count value with the activity threshold value.

16. The circuit of claim 13 wherein the comparator generates a control signal that instructs a control circuit to grant a memory access priority to the image decoder only when the image decoder delay is greater than a predetermined level, and otherwise granting the microprocessor the memory access priority.

17. The circuit of claim 13 wherein the updating the count value means incrementing the count value.

18. The circuit of claim 13 wherein the arithmetic logic unit is a subtractor that subtracts the activity threshold value from the count value.

19. The circuit of claim 13, further comprising a controller that grants wherein the microprocessor a memory access priority when the sign of the count value is negative.

20. The circuit of claim 13 wherein the image decoder is an MPEG decoder.

21. A method of sharing a common memory between a microprocessor and an image decoder for decoding an image sequence, the method comprising:

determining an image decoder delay based on an activity level of the image decoder;

granting the image decoder a memory access priority only when the image decoder delay is greater than a predetermined level, thereby temporarily debasing microprocessor performance; and otherwise granting the microprocessor the memory access priority.

22. The method of claim 21 wherein a plurality of additional circuits can further share the common memory by dividing the memory access priority into access time periods, each additional circuit being assigned a predetermined number of access time periods and the microprocessor and the image decoder being assigned a predetermined number of access time periods to share together.

23. The method of claim 21 wherein the image decoder is a MPEG decoder.

* * * * *